United States Patent
Harada et al.

(10) Patent No.: US 6,381,068 B1
(45) Date of Patent: *Apr. 30, 2002

(54) REFLECTIVE PROJECTION SCREEN AND PROJECTION SYSTEM

(75) Inventors: Takashi Harada, Machida; Yorinobu Takamatsu; Makoto Ishikawa, both of Kanagawa, all of (JP); Charles L. Bruzzone, Woodbury, MN (US); Robert S. Moshrefzadeh, Oakdale, MN (US); Timothy J. Nevitt, Minneapolis, MN (US); Andrew J. Ouderkirk, Woodbury, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,159

(22) Filed: Mar. 19, 1999

(51) Int. Cl.$^7$ ................................................ G03B 21/56

(52) U.S. Cl. ....................................................... 359/443

(58) Field of Search ................................ 359/500, 492, 359/494, 495, 452, 599, 487, 485, 498, 583, 584, 490, 443; 349/87, 96, 112

(56) References Cited

U.S. PATENT DOCUMENTS

| | | | |
|---|---|---|---|
| 3,124,639 A | 3/1964 | Kahn | 88/65 |
| 3,610,729 A | 10/1971 | Rogers | 350/157 |
| 3,711,176 A | 1/1973 | Alfrey, Jr. et al. | 350/1 |
| 3,860,036 A | 1/1975 | Newman, Jr. | 138/45 |
| 4,123,141 A | 10/1978 | Schuler | 350/159 |

(List continued on next page.)

FOREIGN PATENT DOCUMENTS

| | | | |
|---|---|---|---|
| EP | 677 768 | 10/1995 | ......... G02F/1/1335 |
| JP | 06095099 | 8/1994 | ......... G02F/1/1335 |
| WO | WO 94/11766 | 5/1994 | |
| WO | WO 95/17303 | 6/1995 | |
| WO | WO 95/17691 | 6/1995 | |
| WO | WO95/17692 | 6/1995 | |
| WO | WO95/17699 | 6/1995 | |
| WO | WO95/27919 | 10/1995 | |
| WO | WO96/19347 | 6/1996 | |
| WO | WO96/31794 | 10/1996 | |
| WO | WO97/01440 | 1/1997 | |
| WO | WO 97/01774 | 1/1997 | ............ G02B/1/10 |
| WO | WO 97/01781 | 1/1997 | ............ G02B/5/08 |
| WO | WO 97/10774 | 1/1997 | |
| WO | WO 97/32226 | 9/1997 | |

OTHER PUBLICATIONS

Schrenk et al., Nanolayer polymeric optical films, Tappi Journal, pp. 169–174, Jun., 1992.

Primary Examiner—Safet Metjahic
Assistant Examiner—Etienne LeRoux
(74) Attorney, Agent, or Firm—Kevin R. Raasch; William D. Miller

(57) ABSTRACT

Reflective front projection screens capable of projecting an image with enhanced contrast and a wide viewing angle in the presence of relatively high levels of ambient light are disclosed along with projection systems using the screens. The projection screens include a reflective polarizing element in combination with a diffusing element and/or glare suppressing element. The reflective polarizing element transmits light of one polarization state and reflects light of a different polarization state. The reflective polarizing element may be diffusely reflective or specularly reflective and the optical properties of the diffusing element and/or glare suppressing element may be selected based on the optical properties of the reflective polarizing element to further enhance image brightness and contrast. The projection systems preferably project an image using light of the polarization state that is reflected by the reflective polarizing element in the screen to further enhance brightness and contrast of the image.

30 Claims, 9 Drawing Sheets

U.S. PATENT DOCUMENTS

| | | | |
|---|---|---|---|
| 4,285,577 A | 8/1981 | Schuler | 350/403 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 5,164,856 A | 11/1992 | Zhang et al. | 359/489 |
| 5,181,130 A | 1/1993 | Hubby, Jr. | 359/42 |
| 5,188,760 A | 2/1993 | Hikmet et al. | 252/299 |
| 5,211,878 A | 5/1993 | Reiffenrath | 252/299 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Funfschilling et al. | 359/53 |
| 5,389,324 A | 2/1995 | Lewis et al. | 264/171 |
| 5,422,756 A * | 6/1995 | Weber | 359/487 |
| 5,448,404 A | 9/1995 | Schrenk et al. | 359/584 |
| 5,473,454 A * | 12/1995 | Blanchard | 359/69 |
| 5,486,935 A | 1/1996 | Kalmanash | 359/37 |
| 5,486,949 A | 1/1996 | Schrenk et al. | 359/498 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 359/487 |
| 5,760,954 A * | 6/1998 | Tatsuki et al. | 359/452 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/1.34 |
| 5,793,456 A * | 8/1998 | Broer et al. | 349/98 |
| 5,808,794 A | 9/1998 | Weber et al. | 359/487 |
| 5,825,542 A * | 10/1998 | Cobb et al. | 359/487 |
| 5,825,543 A | 10/1998 | Ouderkirk et al. | 359/494 |
| 5,867,316 A | 2/1999 | Carlson et al. | 359/500 |
| 5,940,211 A * | 8/1999 | Hikmet et al. | 359/490 |
| 6,024,455 A * | 2/2000 | O'Neill et al. | 359/530 |

* cited by examiner

REFLECTIVE PROJECTION SCREEN AND PROJECTION SYSTEM

FIELD OF THE INVENTION

The present invention relates to a reflection-type projection screens and projection systems using reflection-type projection screens. More particularly, the present invention provides projection screens including a reflective polarizing element in combination with a diffusing element and/or glare suppressing element.

BACKGROUND OF THE INVENTION

Conventional projection screens for use with, e.g., overhead projectors, slide projectors, and liquid crystal projectors, typically include transparent or translucent porous fine particles held in a transparent medium and a reflective material located behind the particles. The projection screens reflect substantially all of the light incident on them, i.e., they reflect ambient light, as well as light from the imaging source. Because a portion of the ambient light is reflected towards the viewers, the image contrast and/or the apparent brightness of the image is often reduced, particularly in areas with relatively high levels of ambient light.

To enhance the brightness of the reflected image, some projection screens include retroreflective elements such as glass beads, etc. to retroreflect the ambient light back in the direction from which it approached the screen. The addition of retroreflective elements, however, narrows the range of angles over which the image can be viewed because the imaging light is also retroreflected. Furthermore, if the source of ambient light is aligned with the viewers, the ambient light can also be retroreflected towards the viewers along with the image.

The brightness of images produced by liquid crystal projectors, in particular, can be relatively low because light of only one polarization state is projected onto the screen due to the nature of the liquid crystal displays used to form the images. When the projection screen reflects ambient light along with the reduced brightness projected image, the image contrast can be significantly reduced. As a result, liquid crystal projectors are used primarily in areas with low levels of ambient light, such as rooms in which the windows are covered with curtains and/or in which artificial lighting is dimmed, to limit the contrast reducing effects of the ambient light. That is undesirable, however, because it can impair the ability of observers in the room to consult written materials, take notes, etc. during presentations.

Attempts to address the brightness and contrast problems associated with liquid crystal projectors have included the use of absorptive polarizers in combination with reflective materials. By incorporating absorbing polarizers in the screens, about one-half of the ambient light can be absorbed by the projection screen rather than reflected as in conventional screens that do not include absorptive polarizing materials.

The absorptive polarizing materials used in the projection screens preferentially allow the transmission of light with a first polarization state and block the transmission of light with a second polarization state. The transmitted light is then reflected back through the absorptive polarizing material by the reflective material. Because the liquid crystal projectors use light of only one polarization state to form images, that light is preferentially reflected by the projection screens. Ambient light, however, typically includes light having both polarization states and, therefore, a significant portion of the ambient light incident on the projection screens is absorbed rather than reflected. As a result, the contrast and apparent brightness of the images formed by the liquid crystal projectors on projection screens including absorptive polarizing materials can be improved as compared to conventional projection screens that reflect light of both polarization states.

Although ideal absorptive polarizing materials transmit all of the incident light of the first polarization state and absorb all of the incident light of the second polarization orientation, actual absorptive polarizing materials absorb at least some of the incident light with the first polarization state along with absorbing light of the second polarization state. As a result, some of the image light is absorbed rather than reflected, thereby reducing image contrast and brightness. Furthermore, in projection screens using absorptive polarizing materials, the absorptive polarizing material is located in front of the reflector. Because of that arrangement, incident light and the imaging light having the preferentially transmitted first polarization state must pass through the absorptive material two times before reaching the viewer. In each of those passes, the absorptive polarizing material can absorb a significant portion of the light with the first polarization state, thereby reducing image brightness.

In addition to the above problems, projection screens with absorptive polarizers that include other elements such as diffusing materials, etc. may also suffer from reduced image brightness and/or contrast if those additional elements cause some of the image light to change polarization states. The portion of the image light that changes to the polarization state absorbed by the absorptive polarizing materials is not available for the viewer. The result is reduced image brightness and/or contrast.

SUMMARY OF THE INVENTION

The present invention provides a reflective front projection screen capable of projecting an image with enhanced contrast and a wide viewing angle in the presence of relatively high levels of ambient light, and a projection system using this screen. The projection screens provide the desired combination of effects by using a reflective polarizing element in combination with a diffusing element and/or glare suppressing element. The reflective polarizing element transmits light of one polarization state and reflects light of a different polarization state.

The reflective polarizing element may be diffusely reflective or specularly reflective. The optical properties of the diffusing element and/or glare suppressing element may be selected based on the optical properties of the reflective polarizing element to further enhance image brightness and contrast.

The projection systems of the present invention preferably project an image using light of the polarization state that is reflected by the reflective polarizing elements in the screens to further enhance brightness and contrast of the image.

The front projection screens of the present invention preferably exhibit improved optical gain as compared to known screens over a desired range of viewing angles. As used herein, "optical gain" of a front projection screen is determined as the ratio of measured screen luminance at a given angle divided by the expected luminance of an ideal Lambertian screen at that angle, where the incident light is directed at the screen along a normal axis. An ideal Lambertian screen diffusely reflects light uniformly in all directions from zero to 90 degrees from the normal axis.

In one aspect, the present invention provides a reflective front projection screen having a front surface facing a viewer, the screen including a specular reflective polarizing element substantially reflecting light having a first polarization state and substantially transmitting light having a second polarization state; and a diffusing element scattering the light having the first polarization state that is reflected by the reflective polarizing element, the diffusing element located between the reflective polarizing element and the front surface of the screen.

In another aspect, the present invention provides a reflective front projection screen having a front surface facing a viewer, the screen including a diffuse reflective polarizing element substantially reflecting light having a first polarization state and substantially transmitting light having a second polarization state; and a glare suppressing element suppressing specular glare from the diffuse reflective polarizing element, the glare suppressing element located between the diffuse reflective polarizing element and the front surface of the screen.

These and other features and advantages of the present invention are described below with reference to illustrative embodiments of the invention.

DETAILED DESCRIPTION OF ILLUSTRATIVE EMBODIMENTS OF THE INVENTION

The reflection-type projection screens and projection systems using the screens include a reflective polarizing element in combination with a diffusing element and/or a glare suppressing element. The diffusing and glare suppressing elements may be combined into a single structure that provides both glare suppression and light diffusion or they may be provided separately. The reflective polarizing element and the diffusing element may also be provided in a single structure that provides both reflective polarization and light diffusion or they may be provided separately as discussed below.

The projection screens/systems may also include other elements such as light absorbing elements, refractive elements, retroreflective elements, reflective elements etc. to enhance brightness and/or contrast in an image projected on the screen.

As used herein, the terms "specular reflection" and "specular reflectance" refer to the reflectance of light rays into an emergent cone with a relatively narrow vertex angle centered around the specular angle, e.g., the vertex angle may be about 10 degrees or less, more preferably about 5 degrees or less, and even more preferably about 2 degrees or less. The terms "diffuse reflection" or "diffuse reflectance" refer to the reflection of rays that are outside the specular cone. The terms "total reflectance" or "total reflection" refer to the combined reflectance of all light from a surface. Thus, total reflection is the sum of specular and diffuse reflection.

Similarly, the terms "specular transmission" and "specular transmittance" are used herein in reference to the transmission of rays into an emergent cone with a relatively narrow vertex angle centered around the specular direction, e.g., the vertex angle may be about 10 degrees or less, more preferably about 5 degrees or less, and even more preferably about 2 degrees or less. The terms "diffuse transmission" and "diffuse transmittance" are used herein in reference to the transmission of all rays that are outside the specular cone. The terms "total transmission" or "total transmittance" refer to the combined transmission of all light through an optical body. Thus, total transmission is the sum of specular and diffuse transmission. As used herein, the term "extinction ratio" is defined to mean the ratio of total light transmitted in one polarization state to the light transmitted in a different polarization state.

Figure 1:
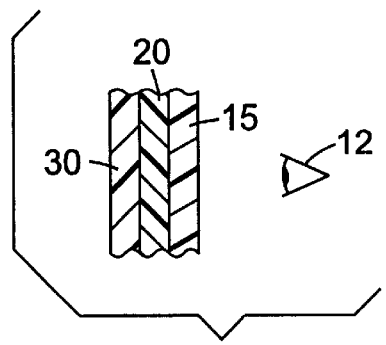
FIG. 1 is a partial cross-sectional diagram of one projection screen according to the present invention.

FIG. 1 illustrates a cross-sectional view of a projection screen in connection with the present invention. The projection screen 10 includes a glare suppressing element 15, a diffusing element 20 and a reflective polarizing element 30. The glare suppressing and diffusing elements 15 and 20 are provided on the side of the front projection screen 10 closest to the viewer 12 to reduce the specular component in the light reflected from the projection screen 10 and to provide a desired viewing angle. The reflective polarizing element 30 transmits light of one polarization state and reflects light of a different polarization state.

The polarization of light may be either linear or circular. Regardless of whether the polarization of light is linear or circular, however, it can be separated into two polarization states. For example, linear polarized light can be described as having a first polarization state and a second polarization state that is orthogonal to the first state. Circular polarized light can be described as having a first polarization state exhibiting clockwise rotation when viewed along its axis of transmission and a second polarization state exhibiting counterclockwise rotation when viewed along the transmission axis.

Whether light exhibits linear or circular polarization, the reflective polarizing element 30 reflects light of one polarization state and transmits light of a different polarization state. By matching the reflective polarizing element 30 to a particular type of light used to project an image on the projection screen 10, the imaging light can be preferentially reflected while significant portions of ambient light incident on the screen 10 are transmitted through the glare suppressing element 15, diffusing element 20 and the reflective polarizing element 30. As a result, image contrast and apparent brightness can be improved as compared to both conventional projection screens and projection screens including absorptive polarizing materials.

The glare suppressing elements 15, diffusing elements 20, and reflective polarizing elements 30 used in projection screens according to the present invention may be manufactured from a variety of different materials. The glare suppressing, diffusing elements and reflective polarizing elements may also exhibit a variety of different optical properties in addition to their basic functions of diffusing light and reflecting light of one polarization state while transmitting light of a different polarization state. Each of these elements will be described in more detail below.

Glare Suppressing Element

The glare suppressing element 15 is provided to suppress the specular reflection of light incident upon the screen 10 due to the interface between the first element in the screen 10 and air (where the first element is the element of the screen closest to the viewer 12). If the first element in the screen 10 has an optically smooth surface, a portion of the light incident upon that element may be specularly reflected by the interface between air and the first element. This specular reflection acts to produce an image of any external light source at the angle of reflection defined by the light source position and the plane of the screen 10. Such a reflected image can result in undesirable glare. One technique to suppress this first-interface glare includes reducing the intensity of the glare with an antireflective material (e.g., a coating). Such materials typically operate by attempting to reduce the intensity level of undesirable glare to an acceptable level by, e.g., controlling refractive index differences at the air to screen interface.

Another approach to glare suppression can include providing an optically rough surface. Examples of optically rough surfaces that can be used to provide the glare suppressing element in screens according to the present invention include, for example, a matte finish, a structured surface, a microstructured surface, or an abraded surface. Optically rough surfaces typically operate by distributing the first-interface reflected light into a wide distribution of angles, rendering glare unobservable. The diffusion may be random, ordered or partially ordered.

The glare suppressing elements used in connection with the present invention may include a combination of an antireflective material and an optically rough surface. The glare suppressing element may also include any other approach that accomplishes the desired suppression of specular glare from the front projection screens of the present invention.

Because the glare suppressing element may be provided in the form of an optically rough surface, that structure, i.e., the optically rough surface, may provide both a glare suppressing element and a diffusing element in front projection screens of the present invention. Referring to FIG. 1, the glare suppressing element 15 and the diffusing element 20 may be provided in a single structure or in different structures.

Diffusing Element

The diffusing elements are provided to assist in the distribution of projector image information into preferred ranges of viewing angle. Diffusing elements may be particularly advantageous when used in combination with specularly reflecting polarizing elements. Diffusing elements may be a bulk, surface, holographic diffusers, or combinations of any of the above diffusers. Bulk diffusers may be, e.g., particles located in a transparent medium. Surface diffusers may be, e.g., an abraded surface, a structured surface, a micro-structured surface, etc. The diffusion provided by the diffusing element may be random, ordered or partially ordered.

The glare suppressing elements 15 and the diffusing elements 20 used in connection with front projection screens of the present invention may exhibit a variety of optical properties in addition to their basic functions of suppressing glare and diffusing light. These optical properties are preferably selected to complement the optical properties of the particular reflective polarizing element used in the screen. Among the optical properties that may be exhibited by the glare suppressing and diffusing elements are: a) relatively high forward transmission of incident light, b) a controlled scattering pattern, and c) preservation of the polarization of light passing through the diffusing element. The glare suppressing and diffusing elements 15 and 20 preferably exhibit one or more of these properties. In addition to the listed optical properties, the glare suppressing and diffusing elements 15 and 20 may also exhibit other optical properties, i.e., the list of optical properties provided above is not intended to limit the optical properties of the glare suppressing and diffusing elements 15 and 20 useful in connection with the present invention.

The first optical property listed above, high forward transmission of light, e.g., transmission of not less than about 70%, more preferably not less than about 80%, of incident light, can prevent or reduce reflection of ambient light from the glare suppressing element 15 or the diffusing element 20 before the light reaches the reflective polarizing element 30. The high forward transmission is preferably exhibited for light traveling in both directions through the glare suppressing element 15 and the diffusing element 20. In other words, light traveling towards the reflective polarizing element 30 is preferably highly transmitted towards the reflective polarizing element 30 and light reflected from the reflective polarizing element 30 is preferably highly transmitted away from the reflective polarizing element 30.

Controlled scattering of light may be exhibited by the diffusing element 20 and may serve to enhance optical gain of the front projection screen 10. To some extent, the glare suppressing element 15 may also exhibit controlled scattering of light if, e.g., the glare suppressing element 15 is provided using, e.g., an optically rough surface. If the glare suppressing element 15 does exhibit some controlled scattering, it may also serve to improve optical gain of the front projection screen 10.

Figure 2:
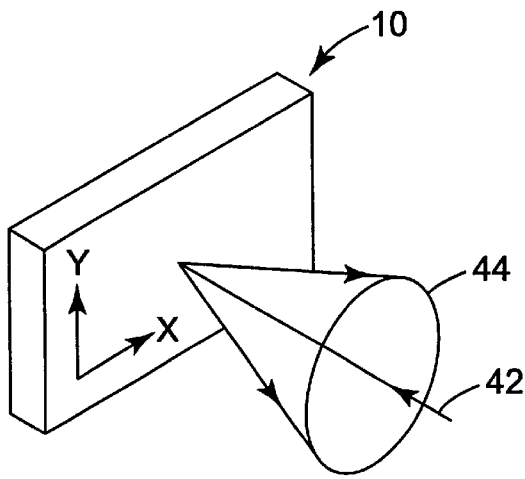
FIG. 2 illustrates an isotropic diffusion pattern from one projection screen according to the present invention.

At a basic level, the glare suppressing element 15 and/or the diffusing element 20 may exhibit isotropic scattering of incident light. By isotropic scattering, it is meant that light is scattered generally in the shape of a right circular cone where the axis of the cone of diffused light is aligned with the direction of the incoming light. An example of isotropic scattering is illustrated in FIG. 2 in which light 42 approaching the screen 10 is reflected in a cone having a directrix 44 in the shape of a circle. As a result, light 42 is diffused equally in both directions defined by the x and y axes in the plane of the projection screen 10.

Alternatively, it may be desirable to provide a glare suppressing element 15 and/or a diffusing element 20 that exhibit anisotropic diffusion. For example, it may be particularly desirable to provide a projection screen in which light is scattered or diffused in a pattern that is wider in one dimension and narrower in another. By controlling the scattering of light from the front projection screens of the present invention, advantages in optical gain can be obtained.

Figure 3:
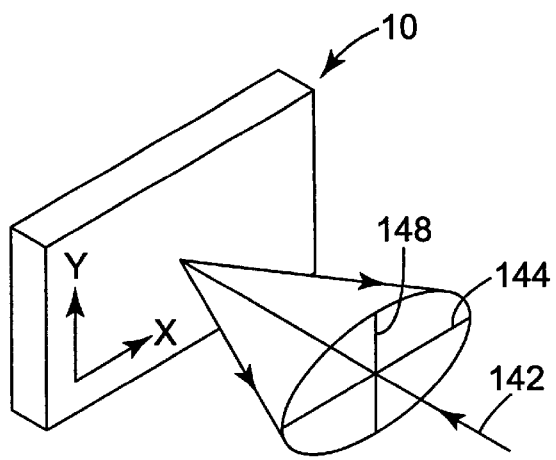
FIG. 3 illustrates an anisotropic diffusion pattern from a projection screen according to the present invention.

FIG. 3 illustrates a projection screen 110 that exhibits anisotropic scattering in which light 142 is reflected in a cone having a directrix 144 in the shape of an ellipse having a major axis 146 and minor axis 148. The major axis 146 is generally aligned with the y-axis and the minor axis 148 is depicted as being generally aligned with the x-axis of the projection screen 110. The diffusion pattern illustrated in FIG. 3 may be particularly useful in meeting rooms or similar places where the audience is located at relatively wide angles on both sides of the screen 110 with little or no variation in their height relative to the screen 110 (where height is measured along the y-axis). Optical gain enhancement may be provided by the projection screen 110 if the lumens that would be diffused over a larger minor axis 148 are, instead, scattered over the smaller minor axis 148 while the major axis 146 of the scattering pattern remains the same. Although FIG. 3 illustrates one example of an anisotropic diffusing pattern, it will be understood that many other anisotropic diffusion patterns could be provided by the glare suppressing and/or diffusing elements used in projections screens according to the present invention. One exemplary diffusing element is described in U.S. Pat. No. 5,473,454 (Blanchard).

In addition to exhibiting either isotropic or anisotropic diffusion, the glare suppressing elements and/or diffusing elements may also exhibit both isotropic and anisotropic diffusion. For example, the diffusing element may provide isotropic diffusion through the use of a bulk diffusing structure (e.g., particles in a transparent medium) and also provide anisotropic diffusion through the use of, e.g., another bulk diffuser or a surface diffuser having a structured, micro-structured or abraded surface. Alternatively, the diffusing element may provide anisotropic diffusion while a separate glare suppressing element may provide isotropic diffusion as a part of its function in reducing specular glare. In yet another alternative, the diffusing element may provide isotropic diffusion while the glare suppressing element provides anisotropic diffusion.

Another optical property that may be exhibited by the glare suppressing elements and diffusing elements used in connection with the projection screens of the present invention is polarization preservation. In other words, the glare suppressing elements and diffusing elements preferably do not convert or otherwise affect the polarization state of a substantial portion of the light passing through them. This optical property is particularly important in connection with projection screens including reflective polarizing elements because converting the polarization state of light passing through the glare suppressing element or the diffusing element may reduce image brightness and/or contrast when the image light is provided with a particular polarization state that is preferentially reflected from the reflective polarizing element. Surface diffusers may generally provide improved performance in terms of polarization preservation as compared to bulk diffusers.

Reflective Polarizing Elements

A variety of reflective polarizing elements can be used in connection with the projection screens according to the present invention. At a basic level, however, all of the reflective polarizing elements used in connection with the present invention transmit light of one polarization state and reflect light of a different polarization state. The materials and/or structures used to accomplish those functions can vary provided that the result is that, for incident light, transmission of one polarization state is obtained along with reflection of a different polarization state.

Examples of materials and constructions that achieve these desired functions can be found in, e.g., multilayer reflective polarizers, continuous/disperse phase reflective polarizers, cholesteric reflective polarizers (which may be combined with a quarter wave plate), and wire grid polarizers. In general, multilayer reflective polarizers and cholesteric reflective polarizers are specular reflectors and continuous/disperse phase reflective polarizers are diffuse reflectors, although these characterizations are not universal (see, e.g., the diffuse multilayer reflective polarizers described in U.S. Pat. No. 5,867,316). Also, the above list of illustrative reflective polarizing elements is not meant to be exhaustive of the reflective polarizing elements useful in connection with the present invention.

Both multilayer reflective polarizers and continuous/ disperse phase reflective polarizers rely on index of refraction differences between at least two different materials (preferably polymers) to selectively reflect light of one polarization orientation while transmitting light with an orthogonal polarization orientation. Illustrative multilayer reflective polarizers are described in, e.g., PCT Publication Nos. WO95/17303; WO95/17691; WO95/17692; WO95/17699; and WO96/19347. One commercially available form of a multilayer reflective polarizer is marketed as Dual Brightness Enhanced Film (DBEF) by Minnesota Mining and Manufacturing Company, St. Paul, Minn.

Diffuse reflective polarizers useful in connection with the present invention include the continuous/disperse phase reflective polarizers described in, for example, U.S. Pat. No. 5,825,543 as well as the diffusely reflecting multilayer polarizers described in, e.g., U.S. Pat. No. 5,867,316. Other reflective polarizing elements useful in connection with the present invention are described in PCT Publication WO 96/31794.

Cholesteric reflective polarizers are also useful in connection with the present invention and are described in, e.g., U.S. Pat. No. 5,793,456. One cholesteric reflective polarizer is marketed under the tradename TRANSMAX™ by Merck Co. Wire grid polarizers may also be used and are described in, e.g., PCT Publication WO 94/11766.

In general, the reflective polarizing elements used in connection with the present invention may include specular reflective polarizers in which light having one polarization orientation is specularly reflected. The reflective polarizers may alternatively be diffuse reflective polarizers in which light having one polarization orientation is diffusely reflected. Diffuse reflective polarizers may provide advantageous anisotropic diffuse reflectance properties. The projection screens of the present invention may use only specular reflective polarizers, only diffuse reflective polarizers, or combinations of specular and diffuse reflective polarizers.

Because of the various optical properties exhibited by both the diffusing elements and reflective polarizing elements that can be used in projection screens and systems according to the present invention, careful selection of different combinations of optical properties provided by both elements may be particularly beneficial. For example, if the reflective polarizing element selected for a particular screen is a diffusely reflective polarizer exhibiting advantageous anisotropic diffuse reflectance of light of one polarization state, it may be desirable to provide only a glare suppressing element, and forego the use of a separate diffusing element. In such a construction, it may be desirable that the glare suppressing element exhibit some isotropic diffusion in addition to merely suppressing specular glare.

If the anisotropic diffuse reflectance properties of the reflective polarizing element do not provide the desired scattering pattern, a diffusing element in combination with a glare suppressing element may provide additional anisotropic diffusion of the reflected light, or they may provide advantageous isotropic diffusion of the reflected light. In still another variation, the diffusing element and glare suppressing element may provide both additional anisotropic diffusion and isotropic diffusion.

Alternatively, the reflective polarizing element may be a specularly reflecting polarizer, in which case the diffusing element may advantageously provide high transmission of incident light, isotropic or anisotropic diffusion, polarization conservation and glare suppression.

The invention will now be described by way of illustrative embodiments. However, the invention is in no way to be limited to these embodiments.

Figure 4:
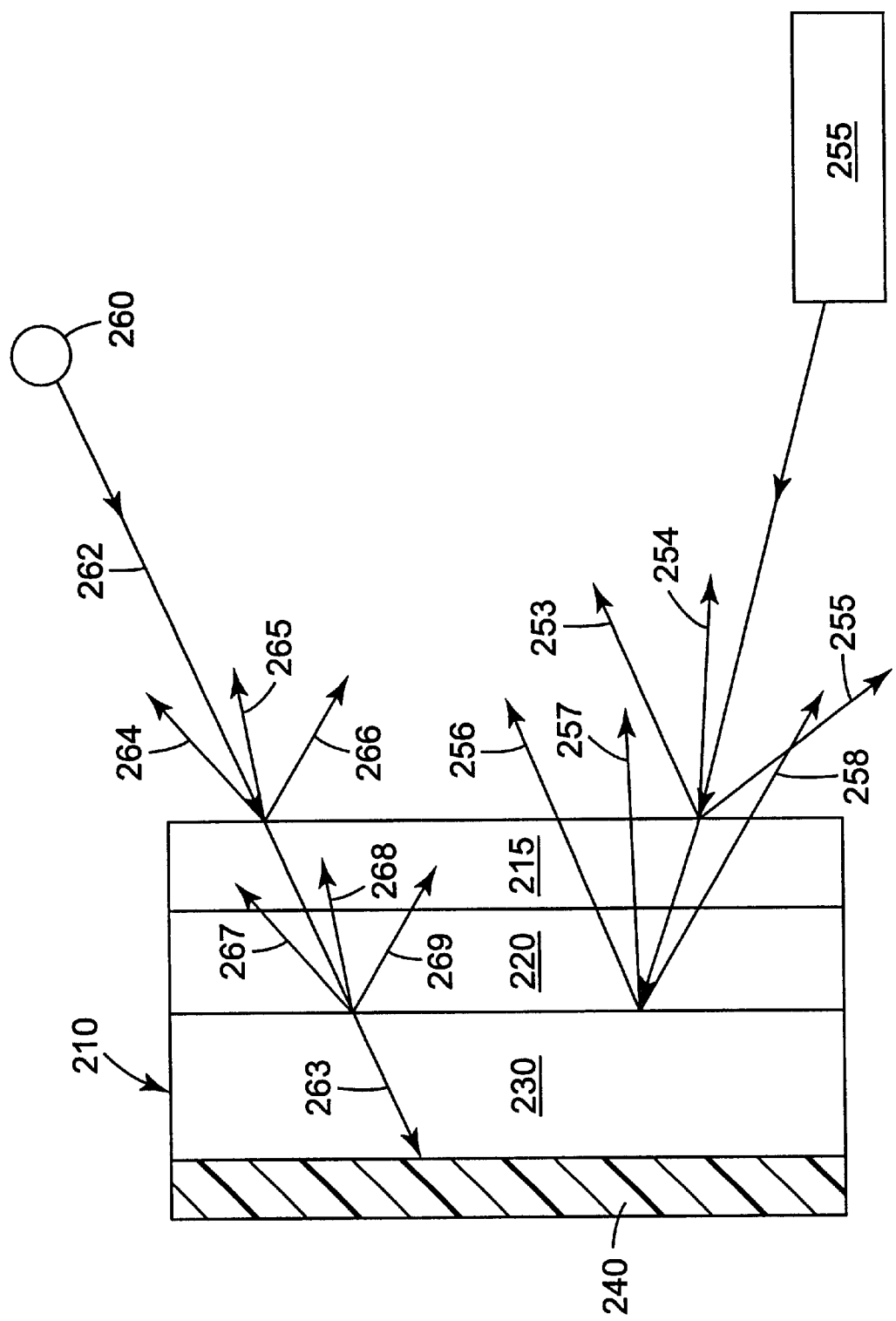
FIG. 4 is a partial cross-sectional diagram of another projection screen according to the present invention.

FIG. 4 is a sectional view illustrating a projection system using a reflection-type projection screen 210 in combination with an image projector 250. Also illustrated in FIG. 4 is a source 260 of ambient light. The reflection-type projection screen 210 includes a reflective polarizing element 230 and a diffusing element 220, and a glare suppressing element 215. The reflective polarizing element 230 preferentially reflects light that has one polarization state and transmits light having a different polarization state.

The projector 250 is capable of projecting polarized light 252 towards the screen 210 to form a reflected image thereon. Examples of suitable image projectors include a conventional liquid crystal projector or a projector constructed according to the principles described in U.S. patent application Ser. No. 09/261,715 filed on Mar. 3, 1999, titled INTEGRATED FRONT PROJECTION SYSTEM (Rodriguez, Jr. et al.) although any image projector producing images using light of one polarization state can be used in systems according to the present invention. When the projection screen 210 having a reflective polarizing element 230 is used together with the projector 250 producing polarized light 252, and when the polarization state of the light 252 from the projector 250 is of the polarization state that is reflected by the reflective polarizing element 230, a substantial portion of the light 252 is reflected from the screen 210.

Ambient light 262 from, for example, light source 260 is depicted in FIG. 4 as also being incident on the projection screen 210 in addition to the light 252 from the projector 250. The ambient light source 260 may be, for example, the sun, in which case the ambient light 262 does not have a particular polarization state and is, hence, polarized in a random fashion. Therefore, the reflective polarizing element 230 reflects about one-half of the ambient light 262. Because the illustrated reflective polarizing element 230 reflects light of one polarization state and transmits light with a second polarization state, a portion of the light 263 having the second polarization state is transmitted through the reflective polarizing element 230.

The projection screen 210 includes a diffusing element 220, and a glare suppressing element 215, located on one side of the polarizing element 230 as seen in FIG. 4. When light 252 from the projector 250, or light 262 from source 260, is incident on the glare suppressing element 215 in the screen 210, the light reflected from this first interface is either diffusely reflected (illustrated by rays 253, 254, 255, and rays 264, 265, and 266, for the projector light 252 and source light 262 respectively), resulting in glare suppression, or specularly reflected at a very low intensity (for an antireflective element). When the light 252 from the projector 250 that is reflected by the polarizing element 230 passes through the diffusing element 220 after reflecting from the polarizing element 230, it is diffused in a variety of directions as denoted by rays 256, 257 and 258 in FIG. 4. As a result, the diffusing element 220 may broaden the range of viewing angles over which the image projected on the projection screen 210 can be viewed by an observer.

Where the polarizing element 230 is a specular reflective polarizer, a portion of the light is specularly reflected. That specularly reflected light is typically brighter than the light that is redirected by the diffusing element 220. Although the diffused light rays exhibit reduced brightness as compared to specularly reflected light, they preferably remain bright enough to present an image to observers located off to one side of the projection screen 210.

Alternatively, the reflective polarizing element 230 may be a diffusely reflecting polarizer in which case the diffusion effects provided by the diffusing element 220 may be selected to complement the diffusing effects provided by the reflective polarizing element 230 itself. For example, if the reflective polarizing element 230 provides isotropic diffusion of the reflected light, the diffusing element 220 may be an anisotropic diffuser selected for its ability to anisotropically diffuse the reflected light in a desired pattern.

Preferably, the diffuse reflecting polarizer reflects the projector image light 252, in an advantageous anisotropic pattern, illustrated in FIG. 4 by rays 256, 257 and 258, eliminating the need for diffusing element 220, and leaves only the need for a glare suppressing element 215.

The projection screen reflects the ambient light 262 in the same manner as the projected light 252. As a result, the portion of the ambient light 262 that is reflected by the polarizing element 230 is also diffused in different directions as illustrated by rays 267, 268 and 269 by the reflective polarizing and/or diffusing elements 230 and 220 respectively. However, because the polarizing element 230 is reflecting only about one-half of the ambient light 262 (with portion 263 being transmitted), the contrast of the image projected by the projector 250 with light 252 is improved by the projection screen 210.

The diffusing element 220 illustrated in FIG. 4 in connection with projection screen 210 may be, e.g., a bulk diffuser. Bulk diffusers may include a transparent base material of, for example, a vinyl chloride/vinyl acetate/vinyl alcohol copolymer and at least one light-diffusing material, such as a pigment and/or beads, dispersed in the transparent base material. The pigments used may include a white pigment (for example, titanium oxide) and may also include one or more colored pigments. In one embodiment, it may be desirable to include a colored pigment, e.g., carbon black, in the transparent base layer to further improve the contrast of the image on the screen by further reducing the brightness of the ambient light reflected from the projection screen 210.

Although there is no particular limitation for the thickness of the diffusing element 220, diffusing element used in connection with the projection screen 210 may preferably allow the screen 210 to be rolled and unrolled repeatedly during use. If a transparent base layer including diffusing particles is used, the base layer may preferably have a thickness of, e.g., from about 1 micrometer up to about 3000 micrometers. In addition to possibly adversely affecting the flexibility of the projection screen 210, more substantial diffusing elements 220 can increase the space required to store the screen 210. Thicker diffusing elements may also increase the weight of the screen 210.

A particular advantage may be gained by employing a diffuse reflective polarizer 230 with an advantageous, anisotropic scattering pattern (see FIG. 3), thus eliminating the requirement for a separate diffusing element 220. In such a front projection screen, however, the glare suppressing element 215 would still preferably be provided to suppress specular glare from the screen 210. If the glare suppressing element 215 relies on diffusion from an optically rough surface to suppress specular glare, the diffusion may preferably be isotropic to potentially improve image quality by isotropically diffusing ambient light as well as image light.

Alternatively, it may be desirable to provide a glare suppressing element 215 in the form of an optically rough surface that anisotropically diffuses glare, with the anisotropy occurring along an axis generally transverse to the axis along which the diffuse reflective polarizer 230 anisotropically reflects the image light. For example, if the diffuse reflective polarizer 230 anisotropically reflects light in a wider range of angles along a horizontal axis, it may be preferred that the glare suppressing element 215 anisotropically reflect glare along a vertical axis. The result may be that glare is generally directed towards the floor and the ceiling of a room containing the screen 210.

The range of viewing angles of the reflection-type projection screen may be controlled based on the particle diameter, refractive index and/or the density of the diffusing element. Specifically, the difference between a refractive index of the light-diffusing material and a refractive index of the transparent resin for the base material is preferably no less than 0.01. Furthermore, the size of the light diffusing particles is preferably 0.1 to 500 micrometers, more preferably 1 to 100 micrometers. As referred to above, the light diffusing particles need not be spherically symmetric if an anisotropic scattering pattern is desirable. In the case where asymmetric particles are used, then the preferable sizes mentioned above refer only to one dimension of the particle.

The relative proportion of the light diffusing material to the transparent base material can vary depending upon the desired range of viewing angles to be provided. In addition, the thickness of the transparent base material can also affect the range of viewing angles provided by the projection screen. In general, higher amounts of light diffusing material in the base material provides wider ranges of viewing angles. For light diffusing materials manufactured of the transparent base materials and light diffusing materials described above, the light diffusing element may preferably include, e.g., from about 1% to about 50%, more preferably from about 5% to about 40% of the light diffusing material to provide desirable ranges of viewing angles.

The light-diffusing elements useful in connection with the projection screens of the present invention are not limited to the diffusing elements specifically described herein. The diffusing elements used in projection screens and systems according to the present invention may, e.g., be a commercially available light-diffusing film, such as PCMS2 manufactured by Tsujimoto Denki K.K.. If the diffusing element is provided in the form of a separate film, the film may be attached to one surface of the polarizing element by, for example, an optically transparent adhesive layer. An example of one such adhesive is a polycarbonate resin with a transmission factor of not less than 90%.

Alternatively, the reflection scattering pattern from a diffuse reflective polarizer element 230 can be controlled through the selection of constituents and process, as described in, for example, U.S. Pat. No. 5,825,543, providing controlled viewing angle ranges without the use of a diffusing element 220.

The projection screen 210 illustrated in FIG. 4 also includes an optional light absorbing element 240 located on the side of the polarizing element 230 that is opposite from the diffusing element 220. The light absorbing element 240 is provided to absorb light transmitted through the reflective polarizing element 230. If the transmitted light 263 is not absorbed after passing through the reflective polarizing element 230, there is the possibility that the light may be reflected back towards the reflective polarizing element 230. That reflected light could degrade the contrast of the image formed on the projection screen 210.

In one embodiment, the absorbing element 240 is preferably highly absorbing for at least light having the transmitted polarization state, more preferably for light of any polarization state. By highly absorbing it is meant, e.g., that the absorbing element 240 absorbs not less than about 90%, more preferably not less than 95%, of incident light that reaches the light absorbing element 240 after passing through the polarizing element 230.

In some cases, it is also preferred that the light absorbing element 240 be non-transmissive to prevent light from, e.g., a light source located behind the screen 210, from reaching the polarizing element 230 after passing through the absorbing element 240. In other words, the absorbing element 240 is preferably opaque across the range of visible wavelengths.

In one embodiment, the absorbing element 240 may be provided in the form of a base material similar to that used in the diffusing element above (for example, a vinyl chloride/vinyl acetate/vinyl alcohol copolymer) in which a light absorbing material, for example, a black pigment such as carbon black, is located. It may be desirable to provide the carbon black at the level of, e.g., about 20 parts by weight to the base material. The base material and light absorbing material may preferably be provided with a thickness of, e.g., about 15 micrometers to achieve suitable light absorption properties.

Alternative embodiments of the absorbing element 240 may include, for example, light diffusing films such as the light-absorbing blackout sheet manufactured by Edmond Scientific Japan Co. which may be mounted on the polarizing element by any suitable techniques and materials. Additional alternative embodiments for the absorbing element 240 are described below in connection with alternative embodiments of the projections screens according to the present invention.

In yet another embodiment, it may be preferable that the absorbing element 240 be opaque across only a portion of the range of visible wavelengths. For example, other absorbing elements may include blue pigments or other blue coloring agents to impart an attractive appearance to the screens. Alternatively, if there is a wavelength dependence to the reflection properties of the reflective polarizing element 240 or more generally to the screen 210, then the absorbing element 240 may be refined to partially reflect light of specific wavelengths to create a wavelength independent reflection spectrum.

Although the reflective polarizing element 230 is depicted as being located on one side of the diffusing element 220, and glare suppressing element 215 in FIG. 4, it will be understood that if the reflective polarizing element 230 is provided as a combination of a cholesteric reflective polarizer and a quarter wave plate, the quarter wave plate could be separated from the cholesteric reflective polarizer. It will be understood that the quarter wave plate can be omitted if the light source used in connection with the particular front projection screen emits circularly polarized light reflected by the cholesteric reflective polarizer used in the screen.

Figure 4A:
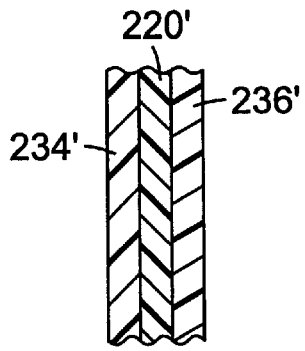
FIG. 4A is a partial cross-sectional diagram of another projection screen according to the present invention.

FIG. 4A illustrates a construction in which a quarter wave plate 234' is located on one side of a diffusing element 220' and a cholesteric reflective polarizer 236' is located on the opposite side of the diffusing element 220'. The diffusing element 220' should be polarization preserving so that light passing through it retains the desired polarization state needed to enhance image brightness and/or contrast. It will be understood that, in addition to the diffusing element 220', other elements could also be located between the quarter wave plate 234' and the cholesteric reflective polarizer 236' provide that the additional elements also did not affect the polarization state of the light passing through them.

Referring again to FIG. 4, projection screens of the present invention may be used in conjunction with light valves or other fixtures and fenestrations which transmit ambient light that is preferentially of a first polarization state. Examples of some such articles and methods are described in, e.g., U.S. Pat. No. 5,686,979; U.S. patent application Ser. No. 08/986,281 titled LIGHT VALVE WITH ROTATING POLARIZING ELEMENT filed Dec. 6, 1997. Other suitable articles and/or systems for controlling polarization of ambient light are described in, e.g., U.S. Pat. No. 4,123,141 (Schuler); U.S. Pat No. 4,285,577 (Schuler); U.S. Pat. No. 5,164,856 (Zhang et al.); and U.S. Pat. No. 5,686,979 (Weber et al.).

When used as a system, incident ambient light 262 would be substantially of a first polarization state 263 that is transmitted through the screen 210 to the absorbing element 240. In this particular configuration, substantially no light of a different polarization state is reflected back as light rays 267, 268, and 269. Hence, contrast is enhanced.

Figure 5:
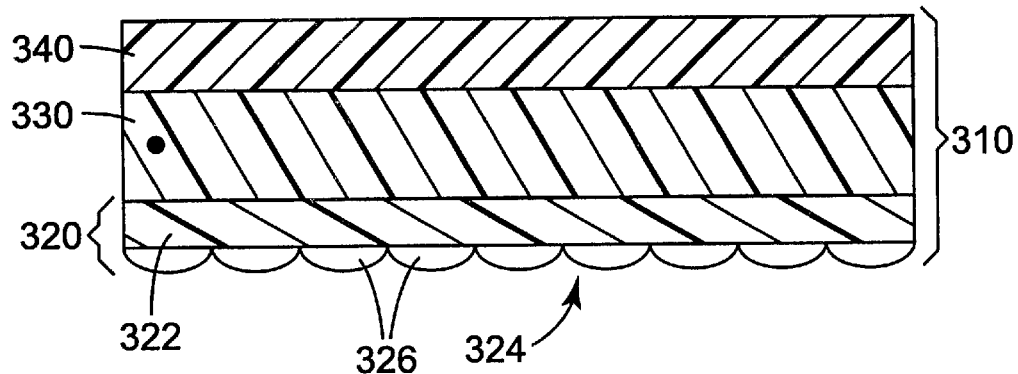
FIG. 5 is a partial cross-sectional diagram of another projection screen according to the present invention.

FIG. 5 illustrates the use of a bulk diffuser in connection with a surface diffuser to obtain additional control over the diffusion pattern provided by the diffusing element. FIG. 5 illustrates a projection screen 310 including a diffusing element 320 on one side of a reflective polarizing element 330 and an optional absorbing element 340 located on the opposite side of the polarizing element 330.

The diffusing element 320 includes a bulk diffuser 322 in combination with a surface diffuser 324 in the form of an array of lenticular elements 326 in the illustrated projection screen 310. The lenticular elements 326 may be provided to increase the distribution of light in directions perpendicular to the length of the elements 326. If, for example, the lenticular elements 326 were aligned with a vertical axis (e.g., the y-axis in FIG. 3), then the reflected light would typically be dispersed over a wider horizontal range by the lenticular elements 326. The structured surface of the surface diffuser 324 may preferably be, e.g., a micro-structured surface. The bulk diffuser 322 of the diffusing element 322 may be provided in the form of an adhesive that can be used to laminate the surface diffuser 324 to the screen 310.

Figure 6:
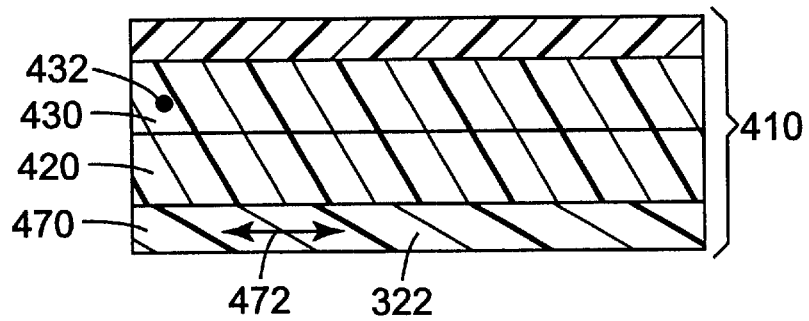
FIG. 6 is a partial cross-sectional diagram of another projection screen according to the present invention.

The projection screens of the present invention may include additional elements to achieve desirable properties. One such additional element is an absorbing polarizer 470 as illustrated in connection with the projection screen 410 depicted in FIG. 6.

The absorbing polarizer 470 preferably absorbs light of one polarization orientation and transmits light of a different polarization orientation. When used in connection with a reflective polarizing element 430 and a diffusing element 420 in the projection screen 410, the absorbing polarizer 470 has a transmission axis 472 that is preferably oriented perpendicular to the transmission axis 432 of the reflective polarizing element 430 (which extends into the page in the view of FIG. 6). As a result, the absorbing polarizer 470 absorbs a portion of the ambient light that would otherwise be diffusely reflected from the diffusing element 420, thereby enhancing the contrast of an image formed on the projection screen 410.

Figure 7:
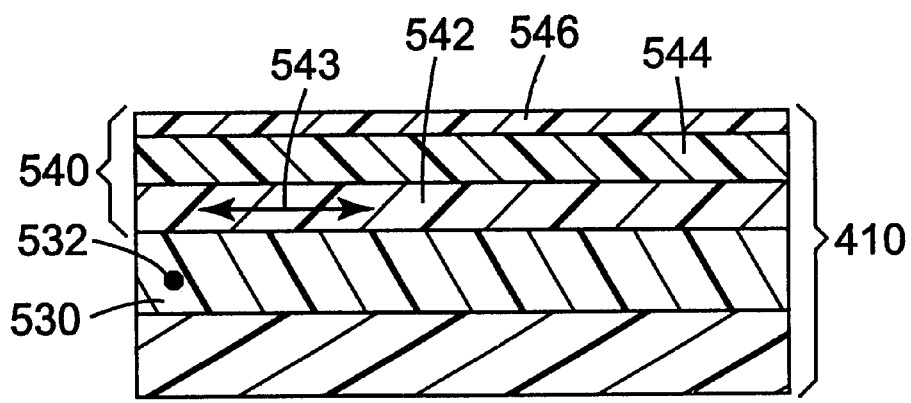
FIG. 7 is a partial cross-sectional diagram of another projection screen according to the present invention.

FIG. 7 illustrates one alternative structure for the absorbing element in projection screens according to the present invention. The absorbing element 540 in the projection screen 510 is provided by an absorbing polarizer 542 having a transmission axis 543 that is preferably oriented perpendicular to the transmission axis 532 of the polarizing element 530. In addition, the absorbing element includes a polarization retarder 544 and a reflective layer 546. The combination of the absorbing polarizer 542, polarization retarder 544 and reflective layer 546 preferably combine to absorb substantially all of the light passing through the polarizing element 530 in manner similar to the absorbing layers including carbon black described above.

Figure 8:
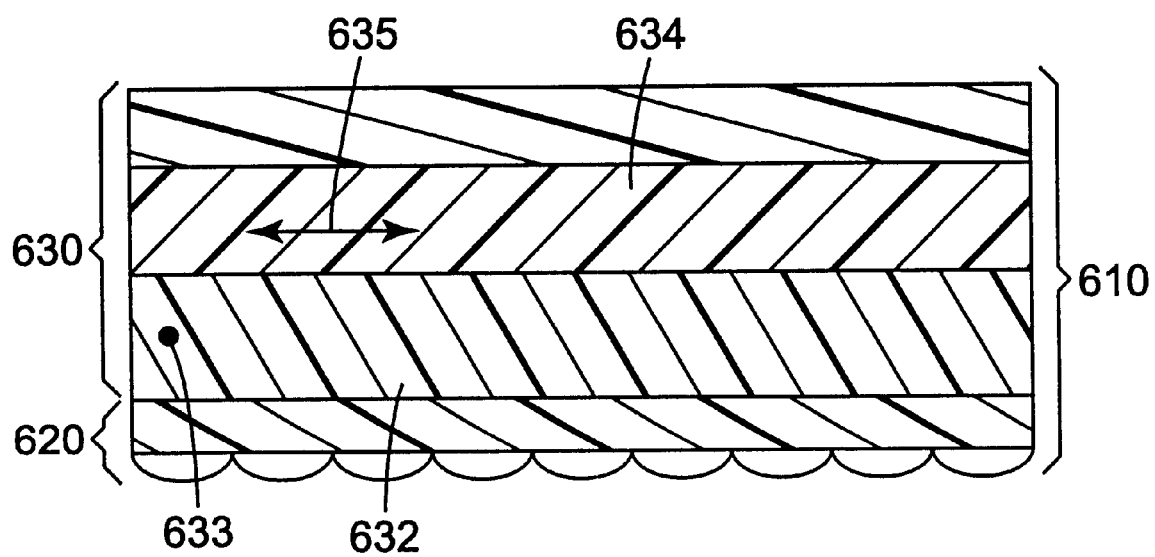
FIG. 8 is a partial cross-sectional diagram of another projection screen according to the present invention.

In addition to, or in place of, providing different combinations of different diffusers for the diffusing elements in projection screens of the present invention, it may also be desirable to combine two or more reflective polarizers in the polarizing elements of projection screens according to the present invention. FIG. 8 illustrates one projection screen 610 including a diffusing element 620, a polarizing element 630 and an optional absorbing element 640.

The polarizing element 630 includes two reflective polarizers 632 and 634 that are preferably coextensive with each other over the surface of the projection screen 610. Polarizer 632 has a transmission axis 633 (extending into the page of FIG. 8) and polarizer 634 has a transmission axis 635 (located in the plane of the page of FIG. 8). In the illustrated embodiment, the transmission axes 633 and 635 are perpendicular to each other. The projection screen 610 can, therefore, be used in connection with projectors that use unpolarized light to project an image, as well as those that project polarized light.

Figure 9:
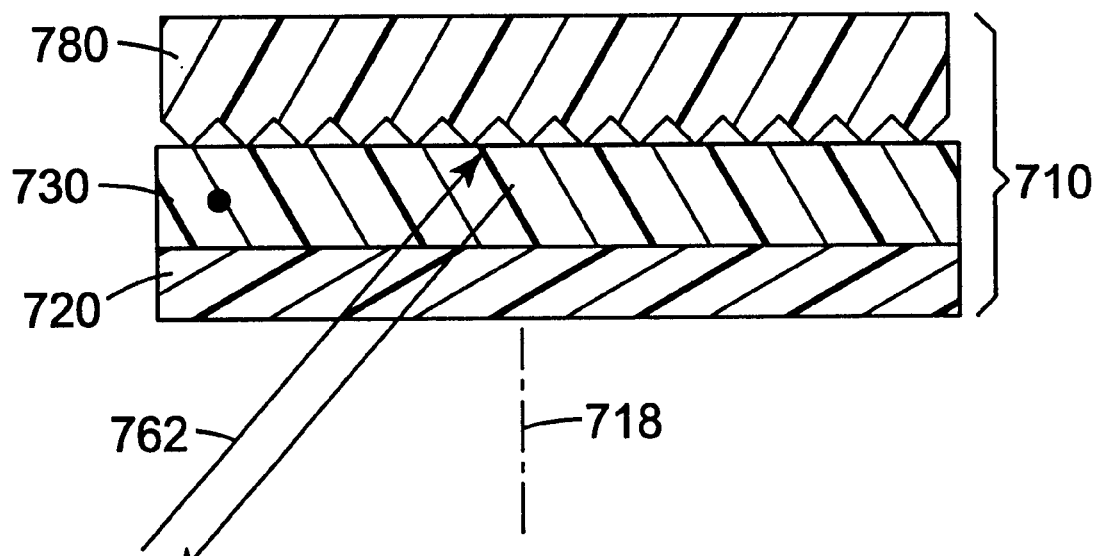
FIG. 9 is a partial cross-sectional diagram of another projection screen according to the present invention.

FIG. 9 illustrates another embodiment of a projection screen 710 including a diffusing element 720, a polarizing element 730 and a retroreflective element 780. The retroreflective element 780 may enhance image quality by retroreflecting ambient light 762 approaching the projection screen 710 at larger angles relative to the normal axis 718 back in the general direction from which it came.

EXAMPLES

Advantages of the invention are illustrated by the following examples. However, the particular materials and amounts thereof recited in these examples, as well as other conditions and details, are to be interpreted to apply broadly in the art and should not be construed to unduly limit the invention.

Example 1

A projection screen was prepared in a manner as described below. First, a solution was prepared by blending 60% by weight of MEK, 23.48% by weight of a vinyl chloride/vinyl acetate/vinyl alcohol copolymer, 8.52% by weight of carbon black and 8.0% by weight of dioctyl phthalate. Next, the solution was applied onto one surface of a DBEF film manufactured by Minnesota Mining and Manufacturing Company, followed by drying to form a light-absorbing layer having a dry thickness of 15 micrometers.

Another solution was prepared by blending 70% by weight of acetone, 22.5% by weight of butyl acrylate/acrylic acid and 9.5% by weight of polystyrene beads. Next, this solution was applied onto the other surface of the DBEF film, followed by drying to form a light-diffusing layer having a dry thickness of 56 micrometers in order to prepare a screen.

Comparative Example A

A high contrast reflection-type screen manufactured by Kurare Plastics K.K. was used in this example. The screen includes a base material of black fabric on which a pigment of aluminum is applied.

Comparative Example B

SILVERLUX film manufactured by Minnesota Mining and Manufacturing Company was used as the light-reflecting layer, and an absorption-type polarizing film (NPF F1025) containing iodine, manufactured by Nitto Denko, K.K., was attached to one side of the light-reflecting layer using a transparent tackifier. A light diffusing layer as described in Example 1 was formed on the polarizing film to complete preparation of the projection screen.

Test Procedures for Example 1 and Comparative Examples A & B

The screens described in each of Example 1 and Comparative Examples A and B were evaluated by measuring the brightness of the light reflected from the screens when light from a liquid crystal projector was directed on them.

The liquid crystal projector was a Model 8030, manufactured by Minnesota Mining and Manufacturing Company which was connected to a personal computer and the images were formed using graphics software (POWERPOINT by Microsoft Corporation). Black and white images were projected on the screens by the projector and the brightness of the images was measured using as light meter (LS-1000, Manufactured by Minolta Co.) that was arranged in a direction normal to the surfaces of the screens. Both the projector and the light meter were located approximately five meters from the screen. The screen was in the shape of a 30 centimeter by 30 centimeter square.

By using the brightness meter, the brightness was first measured when the white light was projected from the liquid crystal projector onto the screen. Table 1 shows brightness' of the different screens. From Table 1, it can be seen that the screen of Example 1 reflects the white light at a brightness that is about twice as great as the screens of Comparative Examples A and B.

Next, by using the graphics software, a white picture was formed, and a corresponding image was projected from the projector in the presence of ambient light and the brightness of the image reflected by the screen was measured. By the same method, the brightness of a black picture corresponding to the white picture was also measured. The brightness of the white picture thus measured was divided by the brightness of the black picture to calculate a contrast for each screen The brightness meter was also arranged in a direction of 35 degrees off of a normal axis of the light-diffusing layer to measure the brightness and to calculate the contrast in a manner as described above.

Table 1 shows the contrasts calculated according to the above-mentioned methods. From Table 1, it can also be seen that the screen of Example 1 provides contrast that is ten times larger than that of Comparative Example A in both the direction normal to the surface of the light-diffusing layer and the direction of 35 degrees relative to the normal direction. The screen of Example 1 provides contrast nearly comparable to that of Comparative Example B in both the direction normal to the surface of the light-diffusing layer and the direction 35 degrees relative to the normal direction.

It is thus learned that the screen of Example 1 reflects light having a brightness higher than that of the conventional screens and effectively enhances the contrast of images.

TABLE 1

| | Example 1 | Comp. Example A | Comp. Example B |
|---|---|---|---|
| Normal Brightness (White Color) | 279 | 108 | 149 |
| Contrast (normal) | 26.3 | 3.9 | 20.4 |
| Contrast (35 degrees) | 11.9 | 3.5 | 12.1 |

Test Procedures for Examples 2–13

Figure 10:
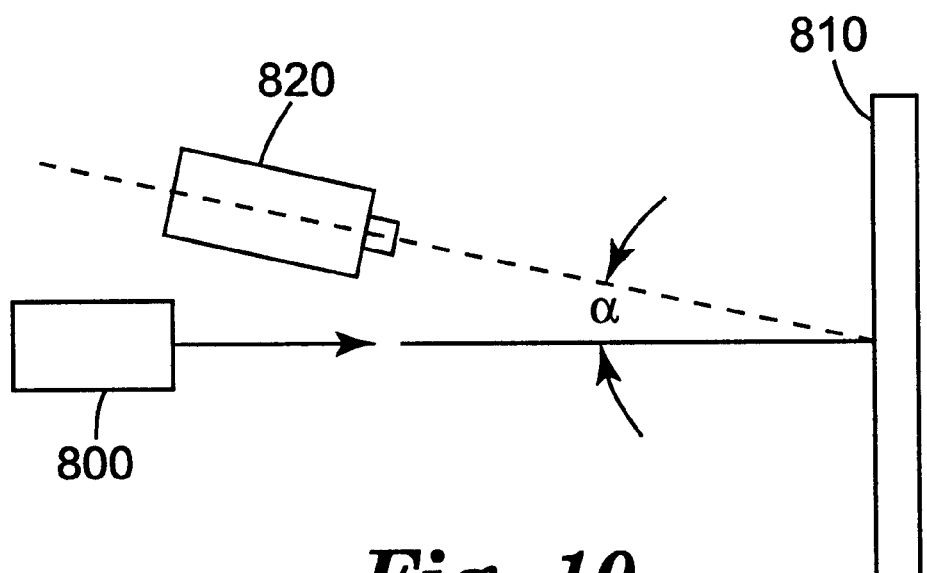
FIG. 10 is a schematic diagram of the test apparatus used in Examples 2–13.

The front projection screens of Examples 2–13 using reflective polarizing elements were tested using a system depicted in FIG. 10 which included a light source 800 providing linear horizontally polarized light. The pass axis of each reflective polarizer in the screens was oriented vertically to provide theoretical maximum reflection of the horizontally polarized light from the light source. The light source 800 was a fiber light guide directing white light at the front projection screen 810 along an axis normal to the planar screen 810. Each of the screens 810 was formed in a square approximately 10 centimeters (cm) by 10 cm and the light source 800 was located about 46 cm from each of the screens 810 during testing.

A photodetector 820 (Minolta LS-100) was also located in front of the screen 810 and used to measure diffuse reflectance of the screens. The distance from the photodetector 820 to the screen 810 was about 46 cm. The minimum angle α between the light source 800 and the photodetector 820 was about six degrees.

The reflective performance of each screen was tested using the apparatus of FIG. 10 by moving the light source 800 and screen 810 relative to the photodetector over a range of angles a relative to the normal incident axis of the light on the screen 810 of minus seventy (−70) degrees to plus seventy (+70) degrees.

Example 2

A front projection screen was manufactured using multi-layer reflective polarizing material marketed as DBEF film by Minnesota Mining and Manufacturing Company.

A diffusing layer was applied to the front surface of the DBEF film to provide a DBEF/diffuser composite. The diffusing layer included beads with an index of refraction of 1.54 in a resin with an index of refraction of 1.47. The beads had a nominal diameter of 5 micrometers and were present in the resin at a loading factor of 33% (by weight). The thickness of the diffusing layer was about 50 micrometers. The results of the reflective performance test of the front projection screen are depicted as gain curve 832 in FIG. 11 to illustrate the performance of the screen relative to other constructions described in Examples 3 and 4 below.

Example 3

A front projection screen was constructed as in Example 2 above. In addition, a black absorptive layer was applied on the back side of the DBEF film, opposite the diffusing layer to provide an absorptive layer/DBEF/diffuser composite. The absorptive layer used was flat black spray paint applied to achieve an opaque layer on the back surface of the DBEF film. Reflective performance of the front projection screen is illustrated as gain curve 833 in FIG. 11.

Figure 12:
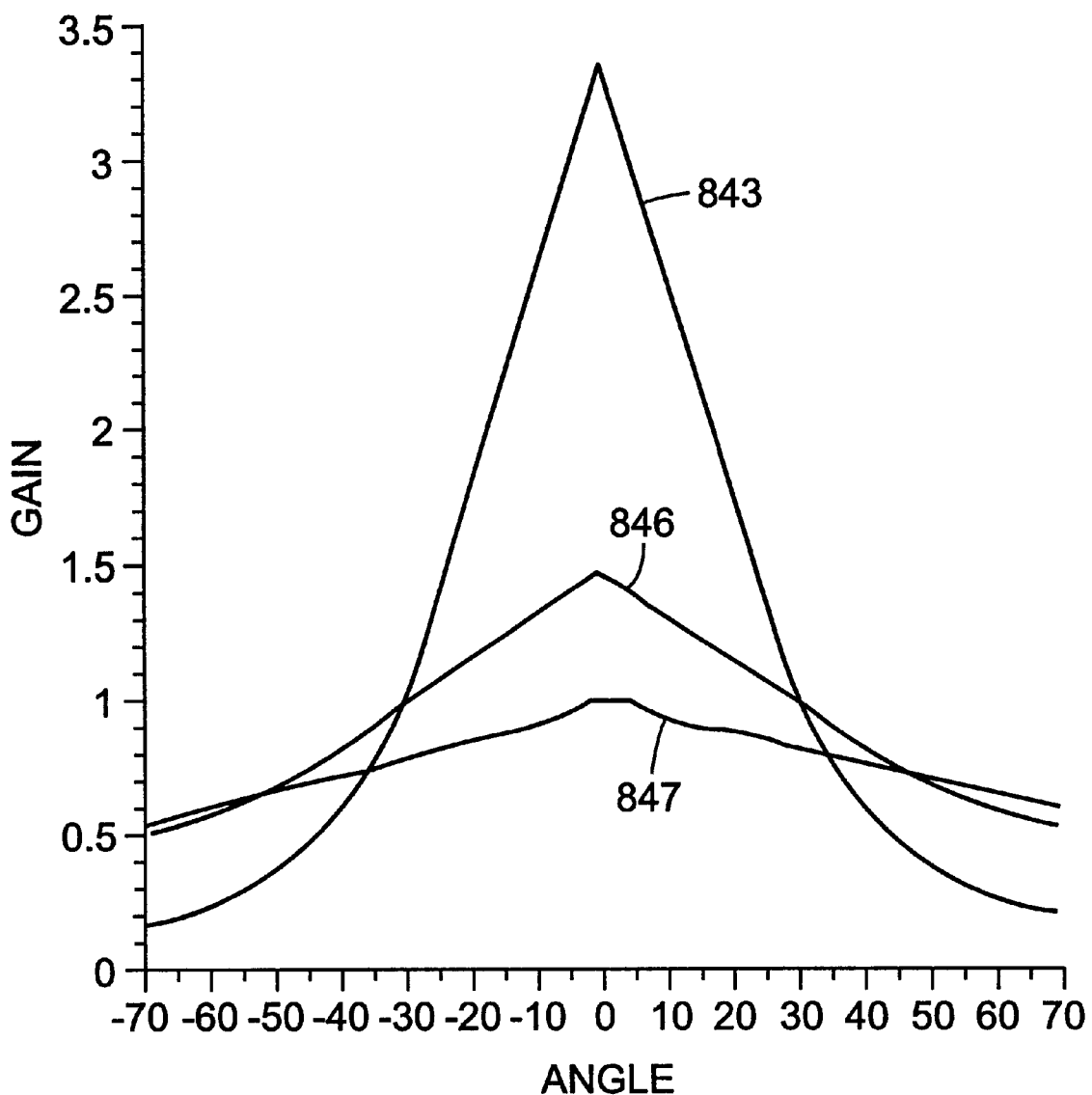
FIG. 12 is a graph of the test results of front projection screens with diffusing layers of varying thickness as discussed in Examples 3, 6 and 7.

The performance of the front projection screen is also depicted in FIG. 12 as gain curve 843 to illustrate the performance of the front projection screen relative to other screens with thicker diffusing layers as described in Examples 6 and 7 below.

Example 4

Figure 11:
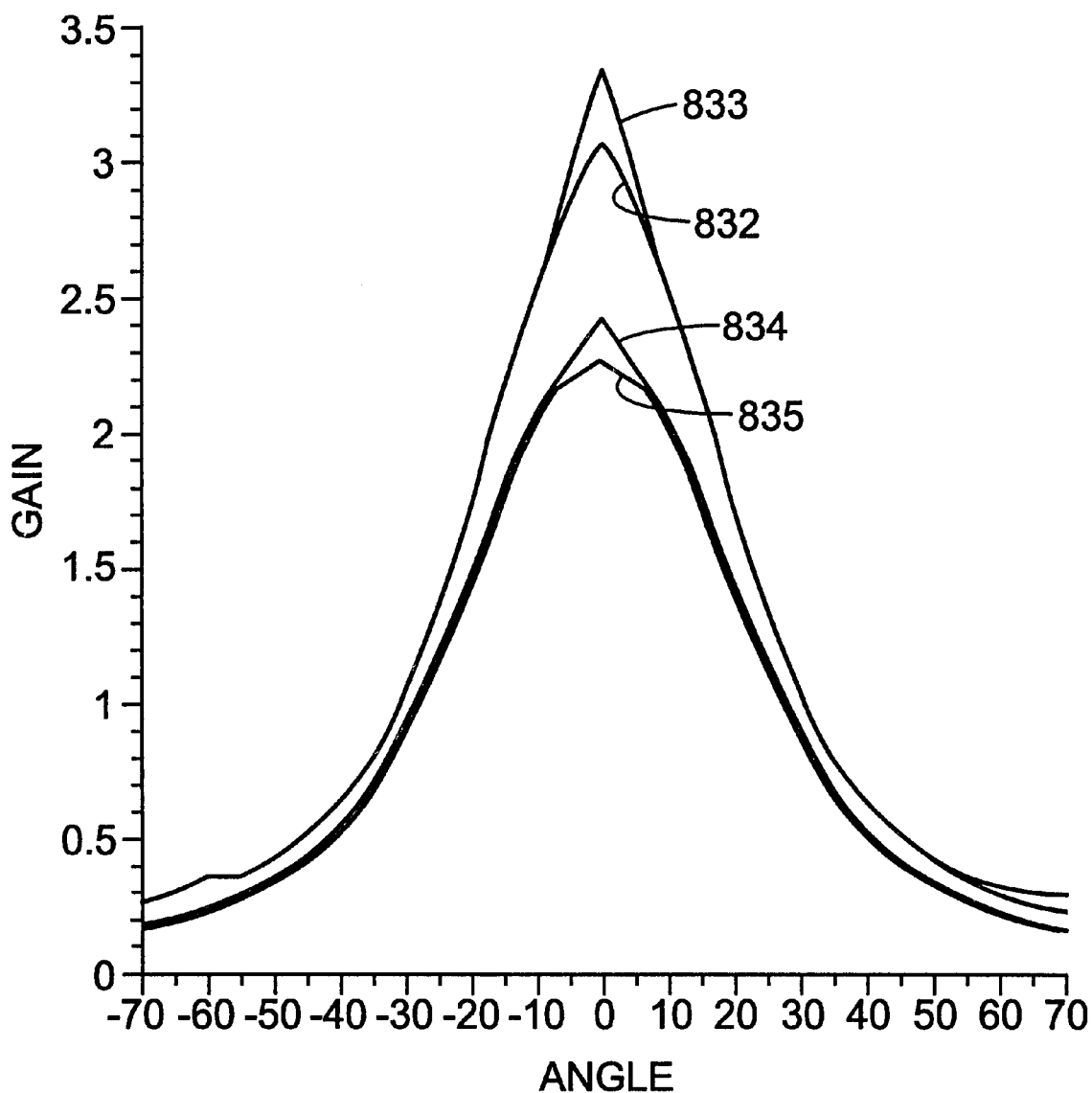
FIG. 11 is a graph of the test results of front projection screens with various constructions as discussed in Examples 2–5.

A front projection screen was constructed as in Example 2 above. In addition, a linear polarizing film was placed over the diffusing layer to provide a DBEF/diffuser/linear polarizer composite. The axis of the linear polarizer was aligned with the horizontal polarization axis of the light from the light source. Reflective performance of the front projection screen is illustrated in FIG. 11 as gain curve 834.

Example 5

A front projection screen was constructed as in Example 4 above. In addition, a black absorptive layer was applied on the back side of the DBEF film, opposite the diffusing layer to provide an absorptive layer/DBEF/diffuser/linear polarizer composite. The absorptive layer used was flat black spray paint applied to achieve an opaque layer on the back surface of the DBEF film. Reflective performance of the front projection screen is illustrated in FIG. 11 as gain curve 835.

Example 6

A front projection screen was constructed as in Example 3 above, with the exception that the diffusing layer was about 110 micrometers thick. Reflective performance of this front projection screen is depicted as gain curve 846 in FIG. 12.

Example 7

A front projection screen was constructed as in Example 3 above, with the exception that the diffusing layer was about 160 micrometers thick. Reflective performance of this front projection screen is depicted as gain curve 847 in FIG. 12.

Example 8

A front projection screen was manufactured using a continuous/disperse phase reflective polarizing material constructed according to the principles discussed in U.S. Pat. No. 5,825,543.

A diffusing layer was applied to the front surface of the reflective polarizing film to provide a reflective polarizer/diffuser composite. The diffusing layer included beads with an index of refraction of 1.54 in a resin with an index of refraction of 1.47. The beads had a nominal diameter of 5 micrometers and were present in the resin at a loading factor of 33% (by weight). The thickness of the diffusing layer was about 50 micrometers. The results of the reflective performance test of the front projection screen are depicted as gain curve 850 in FIG. 13.

Example 9

A front projection screen was constructed as in Example 8. In addition, a black absorptive layer was applied on the back side of the reflective polarizing material, opposite the diffusing layer to provide an absorptive layer/reflective polarizer/diffuser composite. The absorptive layer used was flat black spray paint applied to achieve an opaque layer on the back surface of the reflective polarizing material. Reflective performance of the front projection screen is illustrated as gain curve 851 in FIG. 13.

Figure 14:
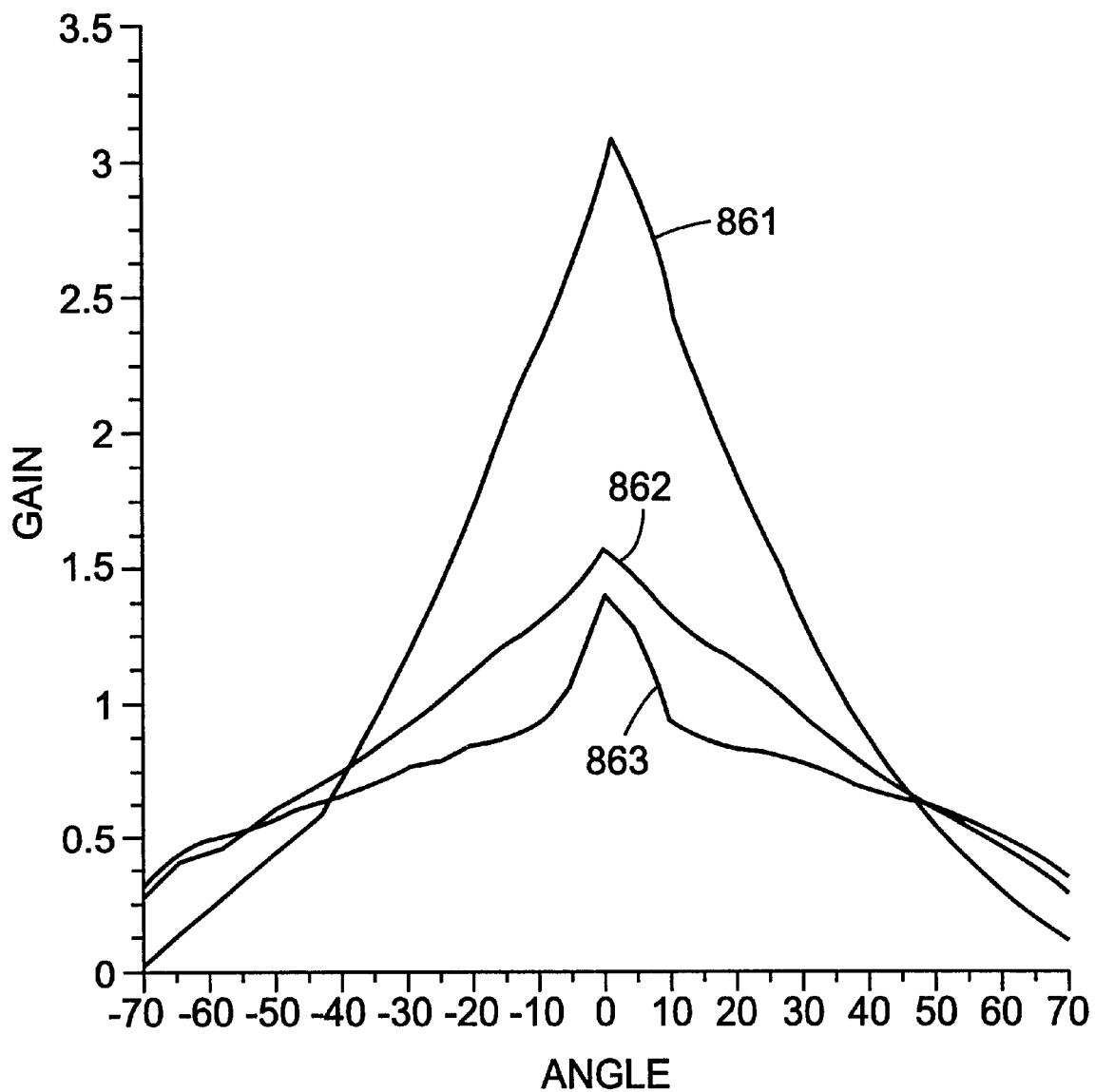
FIG. 14 is a graph of the test results of front projection screens with diffusing layers of varying thickness as discussed in Examples 9, 12 and 13.

The performance of the front projection screen is also depicted in FIG. 14 as gain curve 861 to illustrate the performance of the front projection screen relative to other screens with thicker diffusing layers as described in Examples 12 and 13 below.

Example 10

Figure 13:
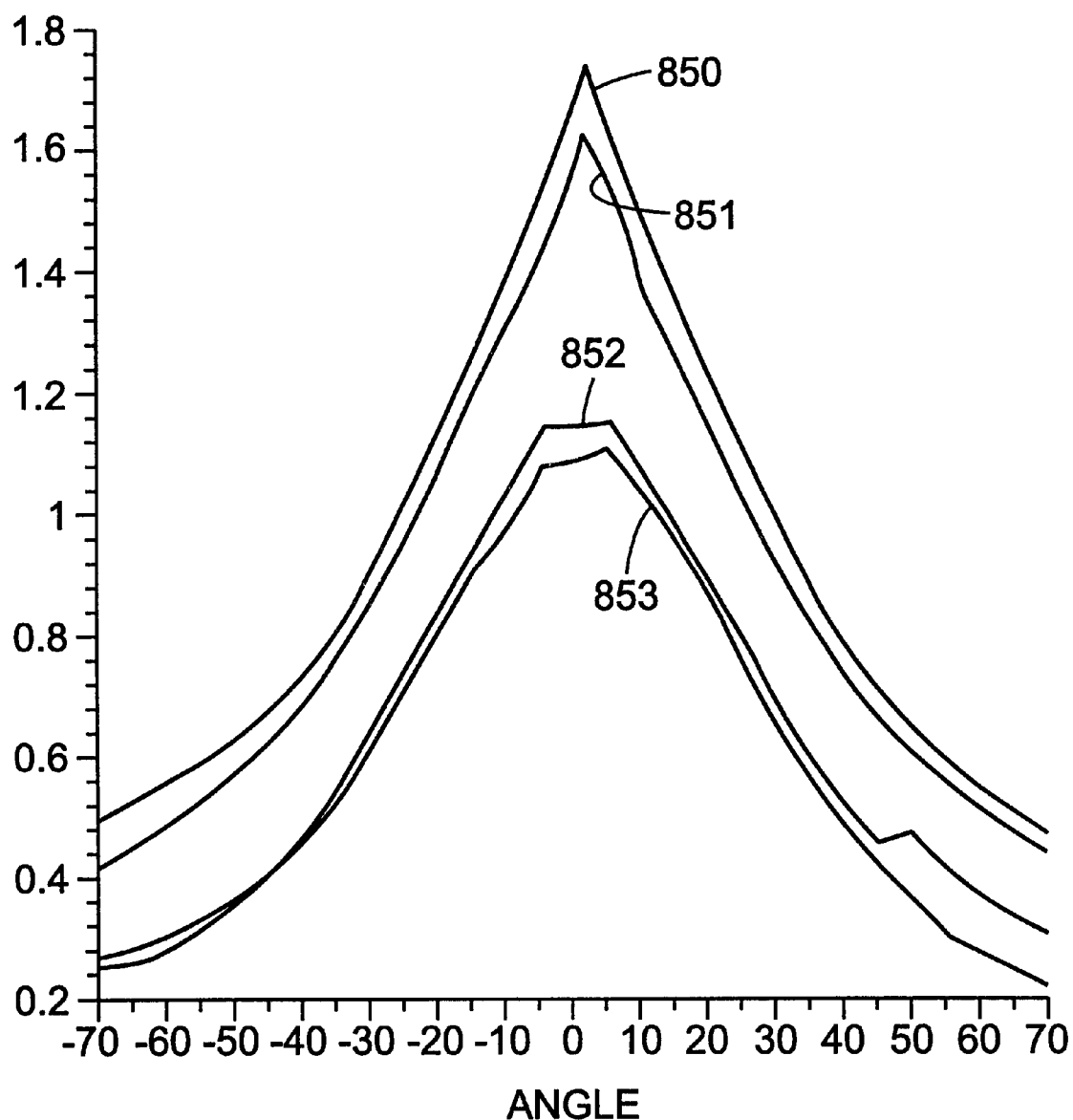
FIG. 13 is a graph of the test results of front projection screens with various constructions as discussed in Examples 8–11.

A front projection screen was constructed as in Example 8. In addition, a linear polarizing film was placed over the diffusing layer to provide a reflective polarizer/diffuser/linear polarizer composite. The axis of the linear polarizer was aligned with the horizontal polarization axis of the light from the light source. Reflective performance of the front projection screen is illustrated in FIG. 13 as gain curve 852.

Example 11

A front projection screen was constructed as in Example 10. In addition, a black absorptive layer was applied on the back side of the reflective polarizing material, opposite the diffusing layer to provide an absorptive layer/reflective polarizer/diffuser/linear polarizer composite. The absorptive layer used was flat black spray paint applied to achieve an opaque layer on the back surface of the reflective polarizing material. Reflective performance of the front projection screen is illustrated as gain curve 853 in FIG. 13.

Example 12

A front projection screen was constructed as in Example 8 above, with the exception that the diffusing layer was about 110 micrometers thick. Reflective performance of this front projection screen is depicted as gain curve 862 in FIG. 14.

Example 13

A front projection screen was constructed as in Example 8 above, with the exception that the diffusing layer was about 150 micrometers thick. Reflective performance of this front projection screen is depicted as gain curve 863 in FIG. 14.

The patents, patent documents, and publications cited herein are incorporated by reference in their entirety, as if each were individually incorporated by reference. Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A reflective front projection screen having a front surface facing a viewer, the screen comprising:
  a specular reflective polarizing element substantially reflecting light having a first polarization state and substantially transmitting light having a second polarization state; and
  a diffusing element scattering the light having the first polarization state that is reflected by the reflective polarizing element, the diffusing element located between the reflective polarizing element and the front surface of the screen; wherein the diffusing element comprises an isotropic diffuser and an anisotropic diffuser.

2. A reflective front projection screen having a front surface facing a viewer, the screen comprising:
  a specular reflective polarizing element substantially reflecting light having a first polarization state and substantially transmitting light having a second polarization state;

a diffusing element scattering the light having the first polarization state that is reflected by the reflective polarizing element, the diffusing element located between the reflective polarizing element and the front surface of the screen;

an absorbing element located to absorb substantially all of the light transmitted through the reflective polarizing element; and a glare suppressing element.

3. A projection screen according to claim 2, wherein the diffusing element is located between the glare suppressing element and the reflective polarizing element.

4. A projection screen according to claim 2, wherein the glare suppressing element comprises an optically rough surface.

5. A projection screen according to claim 2, wherein the absorbing element is opaque.

6. A projection screen according to claim 2, wherein the absorbing element absorbs at least light having the second polarization state.

7. A projection system comprising a projection screen according to claim 2 and an image projector projecting an image using light of the first polarization state.

8. A projection screen according to claim 2, wherein the diffusing element isotropically diffuses light.

9. A projection screen according to claim 2, wherein the diffusing element anisotropically diffuses light.

10. A projection screen according to claim 2, wherein the diffusing element comprises a bulk diffuser.

11. A projection screen according to claim 2, wherein the diffusing element comprises a surface diffuser.

12. A projection screen according to claim 2, wherein the reflective polarizing element comprises first and second materials, at least one of the first and second materials being birefringent, wherein a refractive index difference between the first and second materials for light having the first polarization state is large enough to substantially reflect the light having the first polarization state, and further wherein a refractive index difference between the first and second materials for light having a second polarization orientation is small enough to substantially transmit the light having the second polarization state.

13. A projection screen according to claim 12, wherein the first and second materials are located in alternating layers.

14. A projection screen according to claim 2, wherein the reflective polarizing element comprises a cholesteric reflective polarizer.

15. A reflective front projection screen having a front surface facing a viewer, the screen comprising:

a diffuse reflective polarizing element substantially reflecting light having a first polarization state and substantially transmitting light having a second polarization state; and a glare suppressing element suppressing specular glare from the diffuse reflective polarizing element, the glare suppressing element located between the diffuse reflective polarizing element and the front surface of the screen.

16. A projection screen according to claim 15, wherein the diffuse reflective polarizing element diffuses the reflected light isotropically.

17. A projection screen according to claim 15, wherein the diffuse reflective polarizing element diffuses the reflected light anisotropically.

18. A projection screen according to claim 15, wherein the glare suppressing element anisotropically scatters light.

19. A projection screen according to claim 15, wherein the glare suppressing element isotropically scatters light.

20. A projection screen according to claim 15, wherein the reflective polarizing element comprises first and second materials, at least one of the first and second materials being birefringent, wherein a refractive index difference between the first and second materials for light having the first polarization state is large enough to substantially reflect the light having the first polarization state, and further wherein a refractive index difference between the first and second materials for light having a second polarization orientation is small enough to substantially transmit the light having the second polarization state.

21. A projection screen according to claim 20, wherein the second material is disposed within the first material of the polarizing element.

22. A projection screen according to claim 21, wherein the second material comprises elongated bodies aligned along a first axis within the first material of the polarizing element.

23. A projection screen according to claim 15, further comprising a diffusing element.

24. A projection screen according to claim 23, wherein the diffuse reflective polarizing element diffuses light anisotropically and the diffusing element diffuses light isotropically.

25. A projection screen according to claim 23, wherein the diffuse reflective polarizing element diffuses light anisotropically and the diffusing element diffuses light anisotropically.

26. A projection screen according to claim 23, wherein the diffuse reflective polarizing element diffuses light isotropically and the diffusing element diffuses light isotropically.

27. A projection screen according to claim 23, wherein the diffuse reflective polarizing element diffuses light isotropically and the diffusing element diffuses light anisotropically.

28. A projection screen according to claim 15, further comprising an absorbing element located to absorb substantially all of the light transmitted through the reflective polarizing element.

29. A projection screen according to claim 28, wherein the absorbing element is opaque.

30. A projection system comprising a projection screen according to claim 15 and an image projecting an image using light of the first polarization state.

* * * * *